US005745718A

United States Patent [19]
Cline et al.

[11] Patent Number: 5,745,718
[45] Date of Patent: Apr. 28, 1998

[54] FOLDER BAR WIDGET

[75] Inventors: Troy Lee Cline; John Anthony Moore, both of Cedar Park; Ricky Lee Poston, Austin, all of Tex.; Jon Harald Werner, Oceanside, Calif.

[73] Assignee: International Business Machines Corporation, Armonk, N.Y.

[21] Appl. No.: 509,676

[22] Filed: Jul. 31, 1995

[51] Int. Cl.⁶ .................................................. G06F 15/00
[52] U.S. Cl. ....................... 395/352; 395/350; 395/353; 395/354
[58] Field of Search ............................. 395/348, 349, 395/350, 352, 353, 354, 356, 357, 333, 334, 339, 340, 616, 621, 358

[56] References Cited

U.S. PATENT DOCUMENTS

| | | | |
|---|---|---|---|
| 5,202,828 | 4/1993 | Vertelney et al. | 395/792 |
| 5,230,072 | 7/1993 | Smith et al. | 395/604 |
| 5,243,697 | 9/1993 | Hoeber et al. | 395/334 |
| 5,335,323 | 8/1994 | Kolnick | 395/340 |
| 5,347,626 | 9/1994 | Hoeber et al. | 395/354 |
| 5,349,658 | 9/1994 | O'Rourke et al. | 395/349 |
| 5,355,497 | 10/1994 | Cohen-Levy | 395/616 |
| 5,386,564 | 1/1995 | Shearer et al. | 395/612 |

*Primary Examiner*—Mark R. Powell
*Assistant Examiner*—Ba Huynh
*Attorney, Agent, or Firm*—Richard A. Henkler; Andrew J. Dillon

[57] ABSTRACT

A computer-implemented method for simultaneously displaying and manipulating the contents of a container using a folder bar widget by displaying a plurality of tabs within the folder bar widget, each tab representing a sub-container of the container thereafter displaying a menu identifying the fist contents (e.g., computer objects) of a first sub-container in response to a pointing device activating a first tab representing the first sub-container. Finally, concurrently displaying a second menu identifying second contents (e.g., computer objects) of a second sub-container in response to the pointing device activating a second tab representing the second sub-container. Therefore, the first contents and the second contents are concurrently displayed.

19 Claims, 7 Drawing Sheets

FOLDER BAR WIDGET

BACKGROUND OF THE INVENTION

1. Field of the Invention

The present invention relates to improvements in desktop computing environments and, more particularly, but without limitation, to a system, method, and memory for allowing a user to simultaneously view, open, and manipulate the contents of a folder container and sub-folder containers using a folder bar widget.

2. Background Information and Description of the Related Art

FIG. 1 illustrates an opened, conventional filemanager window 100 for storing computer objects in multiple sub-folder containers 102 which, in turn, are stored in folder container 110. Filemanager window 100 further includes menu bar 104 having FILE, OPTIONS, FONTS, and EXIT items displayed therein. If the user places a mouse pointer over FILE item 106 while holding a first mouse button, FILE drop-down menu 108 is displayed. To make a selection, the user continues to press and hold the first button of the mouse while dragging the pointer through drop-down menu 108 until the proper choice is highlighted. The user then releases the mouse button to select the highlighted choice. However, the user can only activate the highlighted choice while within the drop-down menu. No other functions, such as drag/drop, are available from the drop-down menu. Further, only one drop-down menu may be displayed at a time. When the pointer moves off a first item onto a second, the choices for the first item close and the drop-down menu for the second item opens. Additionally, the contents of a drop-down menu is not user-modifiable, nor can users alter the contents of menu bar 106.

FIG. 2 illustrates a prior art opened DOGS sub-container 102 having computer objects 202 stored therein. To open a computer object 202, the user must double click over the desired computer object 202. This process is time consuming because the user must double click over DOGS sub-folder container 102 to open it and then double click over the desired computer object 202.

Referring again to FIG. 1, to open more than one sub-folder container 102, the user must individually open each sub-folder container. However, the user may not be able to simultaneously view the contents of all opened sub-folder containers 102 because there is limited screen space. If a user tries to compare the contents of two sub-folder containers, the user must switch back and forth between the two views while trying to memorize what he just viewed. Other solutions, such as tree viewers and open-in-place viewers (not shown), take up less space but are slow due to multiple clicks, scrolling, and the depth of their storage hierarchies.

Accordingly, there would be great demand for a compact storage access technique that allows the user to simultaneously view, open, and manipulate the contents of a folder container and sub-folder containers.

SUMMARY

The present invention includes a computer-implemented method, system, and article of manufacture for simultaneously displaying and manipulating the contents of a container and/or sub-containers using a folder bar widget. The first step includes displaying a plurality of tabs within the folder bar widget. Each tab represents a sub-container within the container. Therefore, a first tab represents a first sub-container. The second step includes displaying a first menu (e.g., drop-down menu) identifying the first contents (e.g., computer objects) of a first sub-container. This step is performed in response to a pointing device activating (e.g., single click; single click and hold) a first tab representing the first sub-container. The third step includes concurrently displaying a second menu identifying second contents (e.g., computer objects) of a second sub-container in response to the pointing device activating a second tab representing the second sub-container. As such, the first contents and second contents are concurrently displayed.

Moreover, the user may add the contents of a second container directly into a sub-container or into the container itself, thereby making it a sub-folder container of the container.

Therefore, it is an object of the invention to provide an enhanced desktop that displays the contents of a container in a single folder bar widget.

It is a second object to provide a DT that allows the user to easily and simultaneously view the contents of multiple sub-containers of the container in the folder bar widget.

It is another object to provide a DT that allows the user to easily add or delete sub-containers to the container using the folder bar widget.

It is a further object to provide a DT that allows the user to easily add or delete objects to sub-containers of the container using the folder bar widget.

It is yet another object to provide a DT that allows the user to easily replace the container displayed in the folder bar widget.

These and other objects, features and advantages will become even more apparent in light of the following drawings and detailed description.

DETAILED DESCRIPTION OF THE PREFERRED EMBODIMENT

The preferred embodiments include a computer-implemented method, a uniquely programmed computer system, and a memory embodying detailed logic for directing a computer system to simultaneously display the contents of multiple folder containers using a unique folder bar widget.

Figure 1:
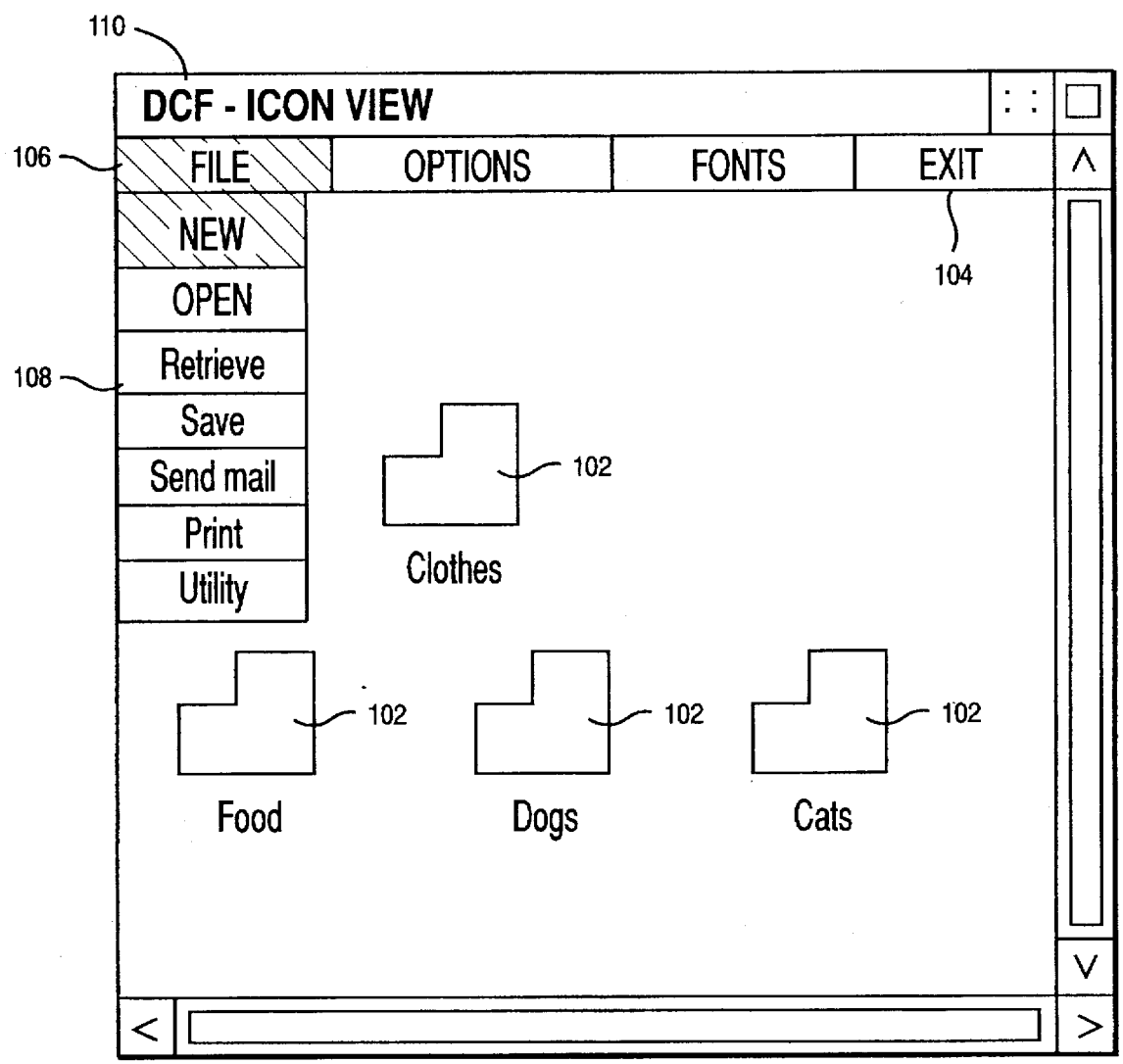
FIG. 1 illustrates an opened, conventional filemanager window for storing objects in multiple folder containers.
Figure 2:
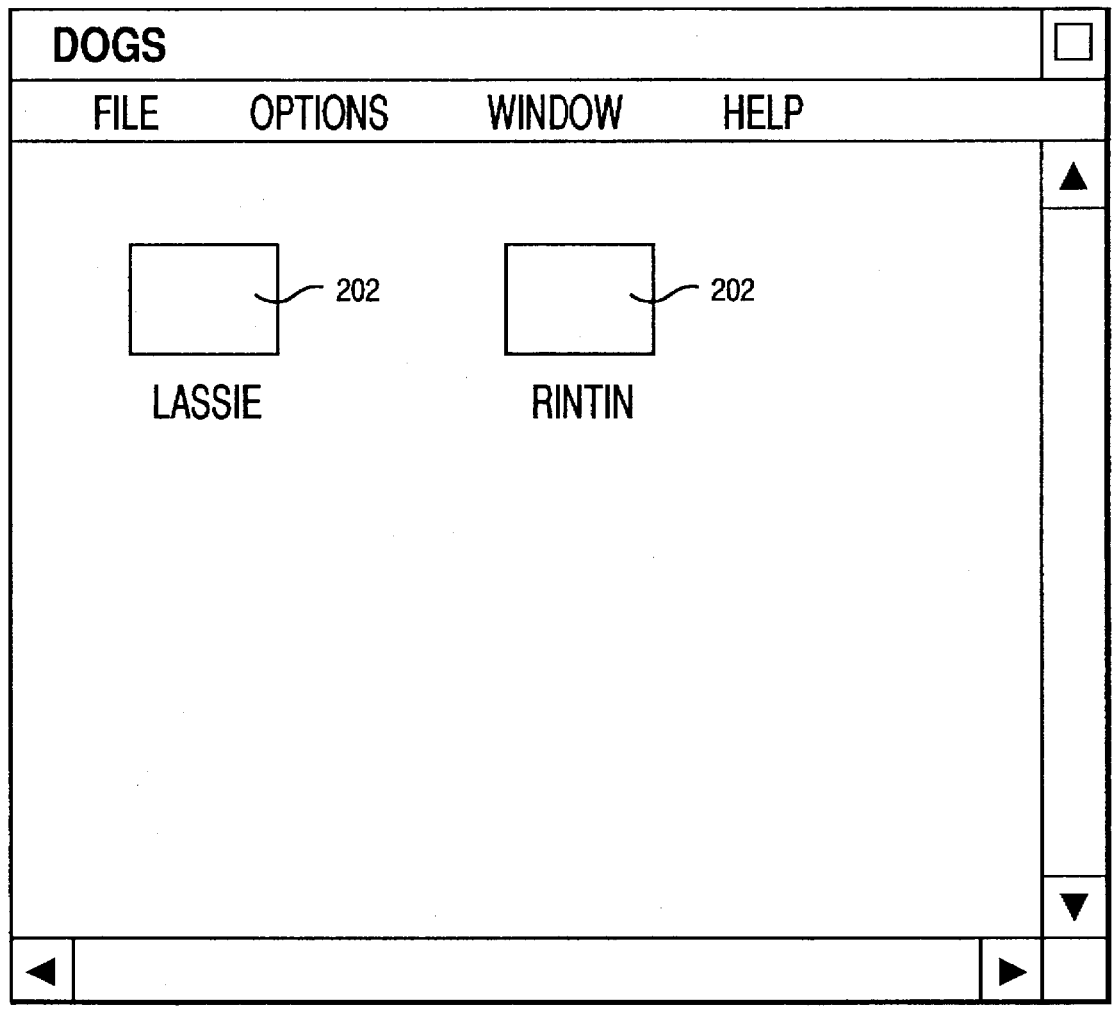
FIG. 2 illustrates a conventional, opened container having objects stored therein.
Figure 3:
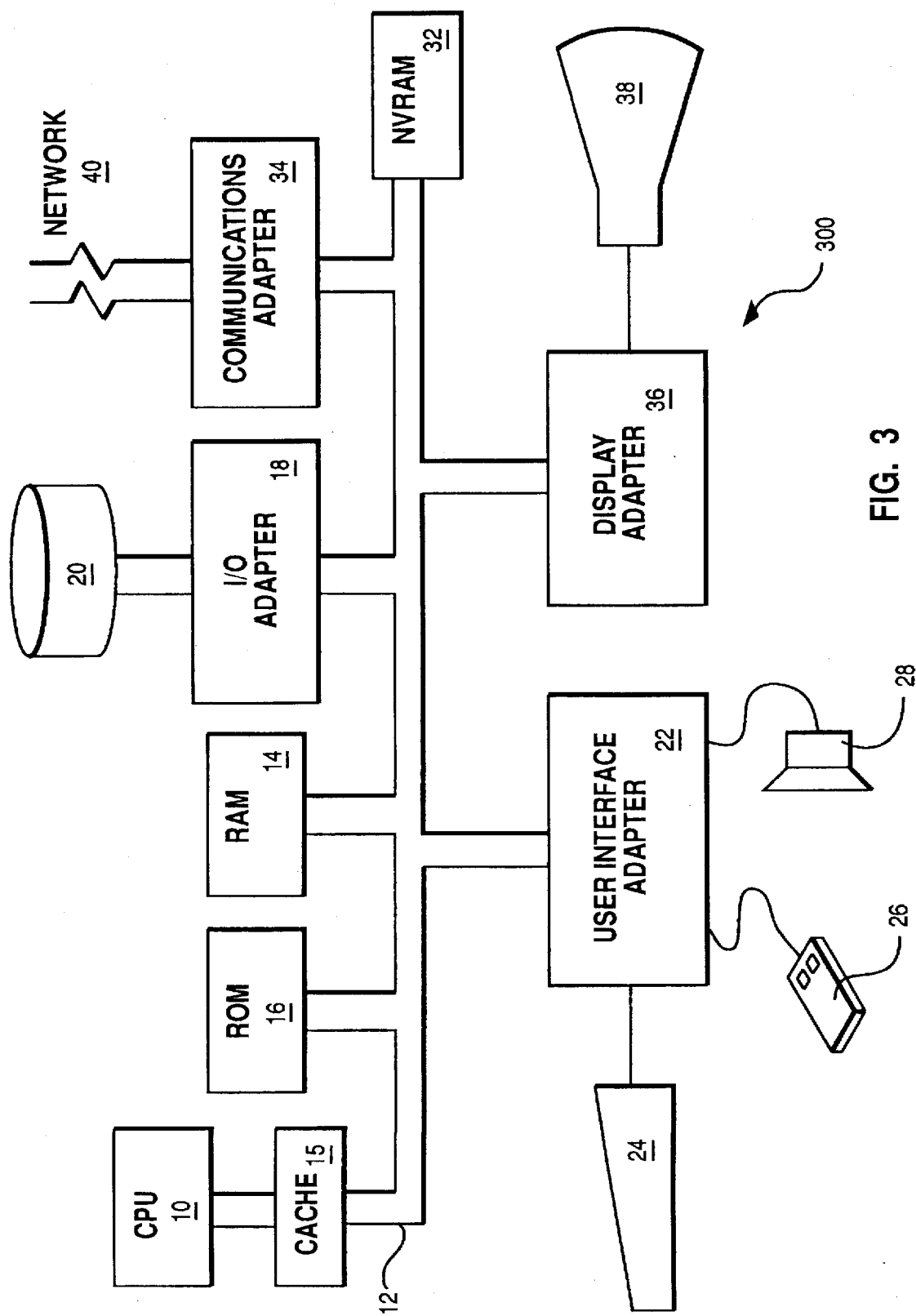
FIG. 3 illustrates a schematic diagram of representative hardware for use with the present invention.

The present invention is practiced in a laptop computer or, alternatively, in the computer system shown in FIG. 3. Computer system 300 includes a central processing unit (CPU) 10, such as an IBM™ PowerPC™ 601 or Intel™ 486 microprocessor, for processing. One or more disks 20, controlled by I/O adapter 18, provide long term storage. A variety of other storage media may be employed, including tape, CD-ROM, and WORM drives. Removable storage media may also be provided to store data or computer process instructions.

Instructions and data from the desktop of any suitable operating system, such as Sun's Solaris™, Microsoft's Windows NT™ or Apple's System 7™, control CPU 10 from random access memory (RAM) 304. Accordingly, the desktop executes from RAM 14. However, in the preferred embodiment, an IBM RISC System/6000™ runs the AIX™ operating system (IBM, RISC System/6000, and AIX are trademarks of the IBM Corp.). As previously described, however, one skilled in the art readily recognizes that other hardware platforms and operating systems may be utilized to implement the present invention.

Users communicate with computer system 300 through I/O devices controlled by user interface 22. Display 38 displays information to the user using display adapter 36, while keyboard 24, speaker 28, and pointing device 26 allow the user to direct the computer system. Communications adapter 34 controls communications between this processing unit and other processing units connected to a network by a network interface. Additional elements include cache 15, ROM 16, and non-volatile RAM 32.

Figure 4:
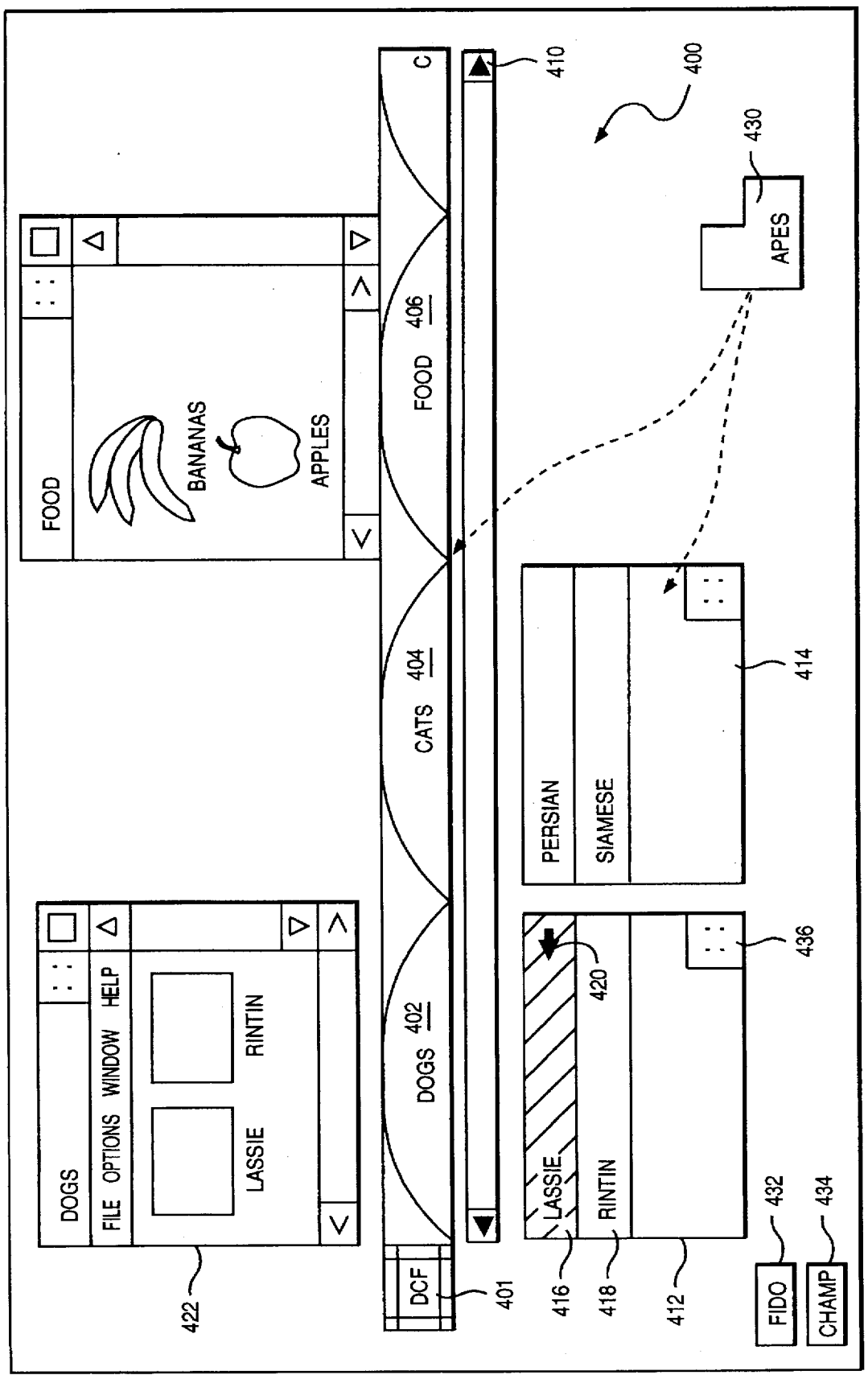
FIG. 4 illustrates a desktop enhancement having a folder bar in accordance with the present invention.

Referring to FIG. 4, the preferred embodiment includes a desktop (DT) enhancement for displaying folder bar 400 on display 38. For ease in explanation, the following description describes the desktop as performing unique functions and features. In actuality, the desktop merely directs CPU 10 to perform those functions and features.

Folder bar 400 is a two-dimensional widget for displaying the contents of a folder container (also referred to as container), such as DCF folder container icon 401, using multiple tabs 402, 404, 406 and others (not shown). Multiple tabs 402, 404, and 406 each represent a sub-folder container (also referred to as sub-container) stored within DCF 401 and has a label displayed therein indicating the name of that folder container. For example, tab 402 represents the sub-folder container named "DOGS". Because folder bar 400 automatically displays the names of the sub-folders stored in DCF 401, folder bar 400 eliminates the need to separately open DCF 401 to view its sub-folders.

Multiple tabs 402, 404, and 406 are positioned adjacent to each other such that there is no wasted space between them. Additional tabs may be added to folder bar 400 by dragging and dropping a folder container icon between two tabs in folder bar 400. For example, if the user drags and drops APES folder container icon 430 between tabs 404 and 406, the DT creates a new tab "APES" within folder bar 400. Importantly, by doing so, the DT adds the contents of APES folder container 430 to the DCF folder container, thereby making APES folder container 430 a sub-folder container of the DCF folder container. Conversely, if the user drags and drops tab 402 out of folder bar 400, the DT removes the contents of the DOGS sub-folder container from the DCF folder container.

To replace the DCF folder container displayed in folder bar 400 with another folder container, the user merely drags and drops a folder container icon over DCF folder container icon 401. For example, if the user drags and drops FIDO folder container icon 432 over DCF folder container icon 401, the names of the sub-folder containers (if any) residing in FIDO folder container 432 appear as tabs in folder bar 400.

The user may use scroll bar 410 to scroll the tabs left and right. The use of a scroll bar is well known in the computer art.

There are four methods to open/manipulate a sub-folder container represented by a tab: drag, single click, double click, and Ctrl+single click. For the drag method, if the user presses the first mouse button while dragging the mouse pointer across a tab, a drop-down menu appears under the tab. When the user drags the mouse pointer across another tab, the prior drop-down menu disappears and a new drop-down menu appears under the tab. Each drop-down menu displays the names of the contents (i.e., computer objects) stored within the sub-folder container represented by the tab. For example, drop-down menu 412 displays LASSIE object 416 and RINTIN object 418 of the "DOGS" folder container (i.e., tab 402). To select a computer object within a sub-folder container, the user holds the first mouse button down while moving the mouse pointer over the desired computer object's name in the drop-down menu. The computer object's name becomes highlighted as the mouse pointer moves over it. If the user releases the first mouse button, the desktop activates that computer object. For example, the user has positioned mouse pointer 420 over LASSIE object 416. If the user releases the first mouse button, the desktop opens LASSIE object 416. In this manner, the user is not required to perform repeated clicking to activate (i.e., open) and deactivate (i.e., close) sub-folder containers and then double click to open an object in those sub-folder containers. All that is required is a single horizontal swipe across a tab, downward motion through a drop-down menu, and then release of the mouse button. Additionally, if the pointer drags so that it crosses the right or left boundaries of the area displaying the tabs, the tab area is automatically scrolled to display any tabs that are outside the view.

For the single click method, if the user single clicks on a tab, the DT displays the contents of the drop-down menu for that tab (i.e., sub-folder container). Clicking on a second tab closes the first drop-down menu and opens a drop-down menu for the second tab. The user may also close a drop-down menu by clicking button 436. For this method, the user selects a computer object within a drop-down by clicking on that object.

For the ctrl+single click method, if the user holds down the ctrl button and clicks the first button once while over the tab, the drop-down menu remains on the display screen. If the use then ctrl+clicks on a second tab, the drop-downns for both tab 1 and 2 stay open simultaneously. For example, both drop-down menus 412 and 414 are concurrently displayed. This feature allows the user to quickly and simultaneously view the contents of multiple sub-folder containers. The user is not required to double click over each sub-folder container icon and then rearrange/adjust the size of the sub-folder containers to simultaneously view their contents.

Additionally, the user may open any sub-folder container by double clicking the first mouse button while positioning the mouse pointer over the tab representing the sub-folder container. For example, if the user double clicks over above 402, the desktop displays secondary window 422 over tab 402. Like drop-down menu 412, secondary window 422 displays the contents of the sub-folder container represented by tab 402. However, secondary window 422 provides additional functionality, such as drag/drop of objects. Secondary windows can be displayed for each displayed tab.

A folder container may be added to a sub-folder container. To do so, the user may either drag/drop the folder container's icon over the sub-folder container's tab in folder bar 400 or over a drop-down menu of the tab. For example, if the user drops APES folder container icon 430 over drop-down menu 414, the DT adds the APES folder into the sub-folder container represented by CATS tab 404. Similarly, if the user drops APES folder container icon 430 over CATS tab 404, the DT adds the APES folder into the sub-folder container represented by CATS tab 404.

Figure 5A:
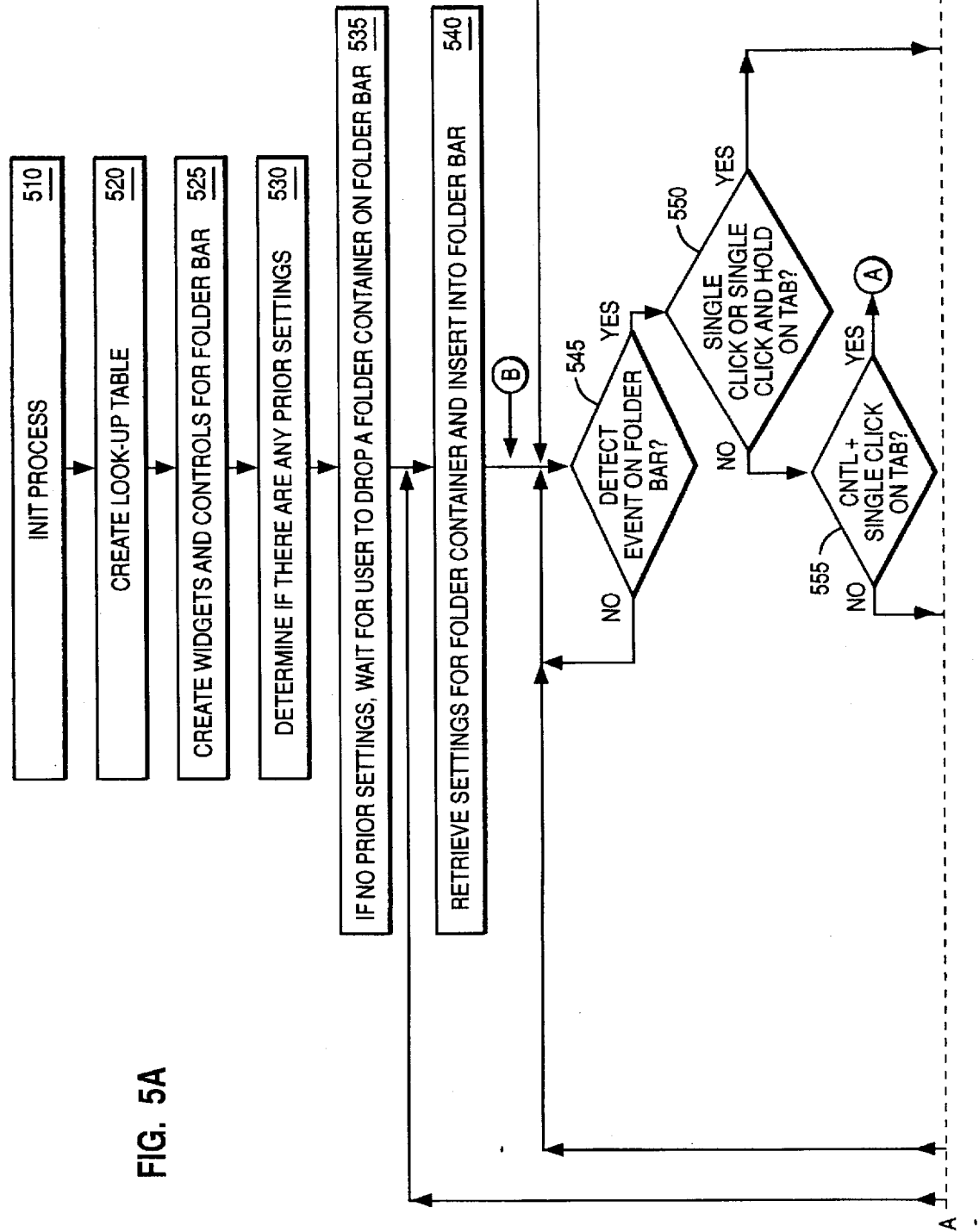
FIGS. 5 and 6 illustrates a flowchart of detailed logic for allowing a user to simultaneously view/manipulate the contents of a folder container.
Figure 5B:
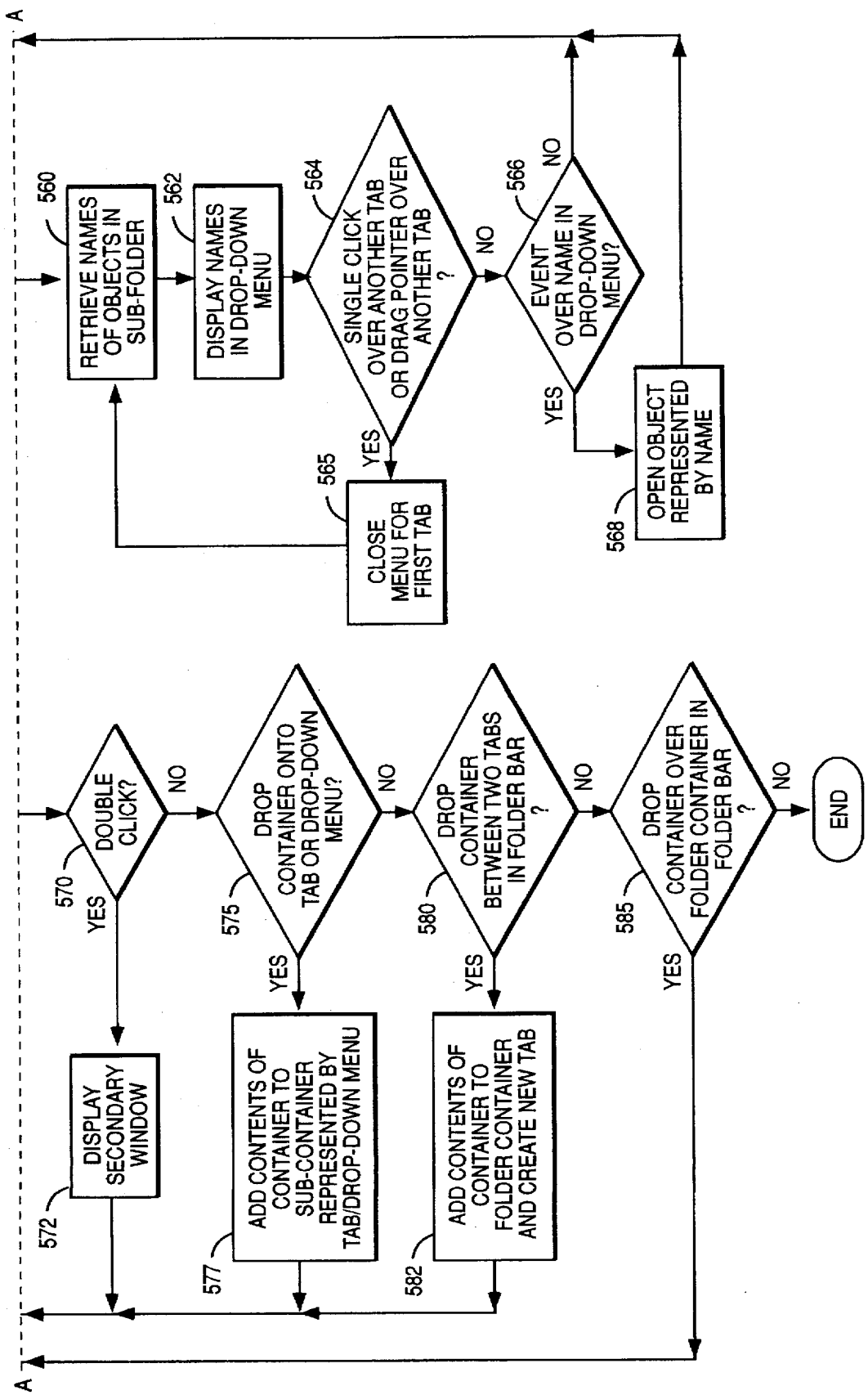

The flow of execution for the preferred embodiment is as follows:

FIG. 5 illustrates a flow chart of detailed logic for allowing a user to simultaneously view, open, and manipulate the contents of multiple sub-folder containers. At 510, the initialization process begins. The DT loads from one drive of disk drives 20 (see FIG. 3) a folder container resource file (not shown) into RAM 14. The folder container resource file includes a list of all sub-folders residing in each folder container, the tab representing each sub-folder container, a default arrangement of those tabs, and descriptive information about the objects present in each sub-folder container. The descriptive information includes the name and image (e.g., icon) representing each object, the location of the icon(s) within the sub-folder container, the command (s) necessary to open the object(s) when selected, and the command(s) executed when a user drops an object on another object. Several conventional DTs utilize resource files and, therefore, they are well known in the computer art. The DT parses this resource file into system-recognizable data.

At 520, the DT allocates space in RAM 14, creates a look-up table in that allocated space for retaining data structures, and populates that look-up table with the parsed data from the resource file. The look-up table dynamically maintains the screen coordinates and contents of folder bar 400, including each tab, sub-folder container, and object(s) stored within each sub-folder container. For example, when the user moves a tab using the scroll bar, its coordinates are updated in the look-up table.

At 525, the DT creates any widgets and controls for folder bar 400 using the newly populated look-up table. At 530, the DT retrieves from hard disk 20 any settings saved from the previous session and populates the look-up table with those settings. If so, the DT changes the default arrangement of the tabs to the previous setting.

At 535, if no prior setting exists, the DT waits for the user to drop a folder container into folder bar 400. At 540, the DT retrieves the settings for the prior setting or newly dropped folder container. The DT then examines the look-up table for that folder container and displays tabs in folder bar 400 representing each sub-folder within the folder container. At 545, the DT wait for an event on folder bar 400 from an event queue (not shown) in RAM 14. The DT determines and dispatches the coordinates of the event to an event loop executing in RAM 14. At 550, a determination is made as to whether the event was a single click or single click and hold over a tab using a conventional software timer. If not, control is directed to 555. If so, at 560, the DT retrieves the names of all objects stored within the sub-folder container represented by the selected tab. At 562, the DT displays those names in a drop-down menu directly beneath the selected tab. At 564, if the DT detects a single click over another tab (i.e., the event at 550 was a single click) or the user drags the mouse pointer over another tab (i.e., the event at 550 was a click and hold), the DT closes the drop-down menu of the first tab and control is directed to 560. If not, at 566, the DT determines if the user has selected one of the names in the drop down menu. If so, at 574, the DT opens the object represented by that name and control returns to 545.

Figure 6:
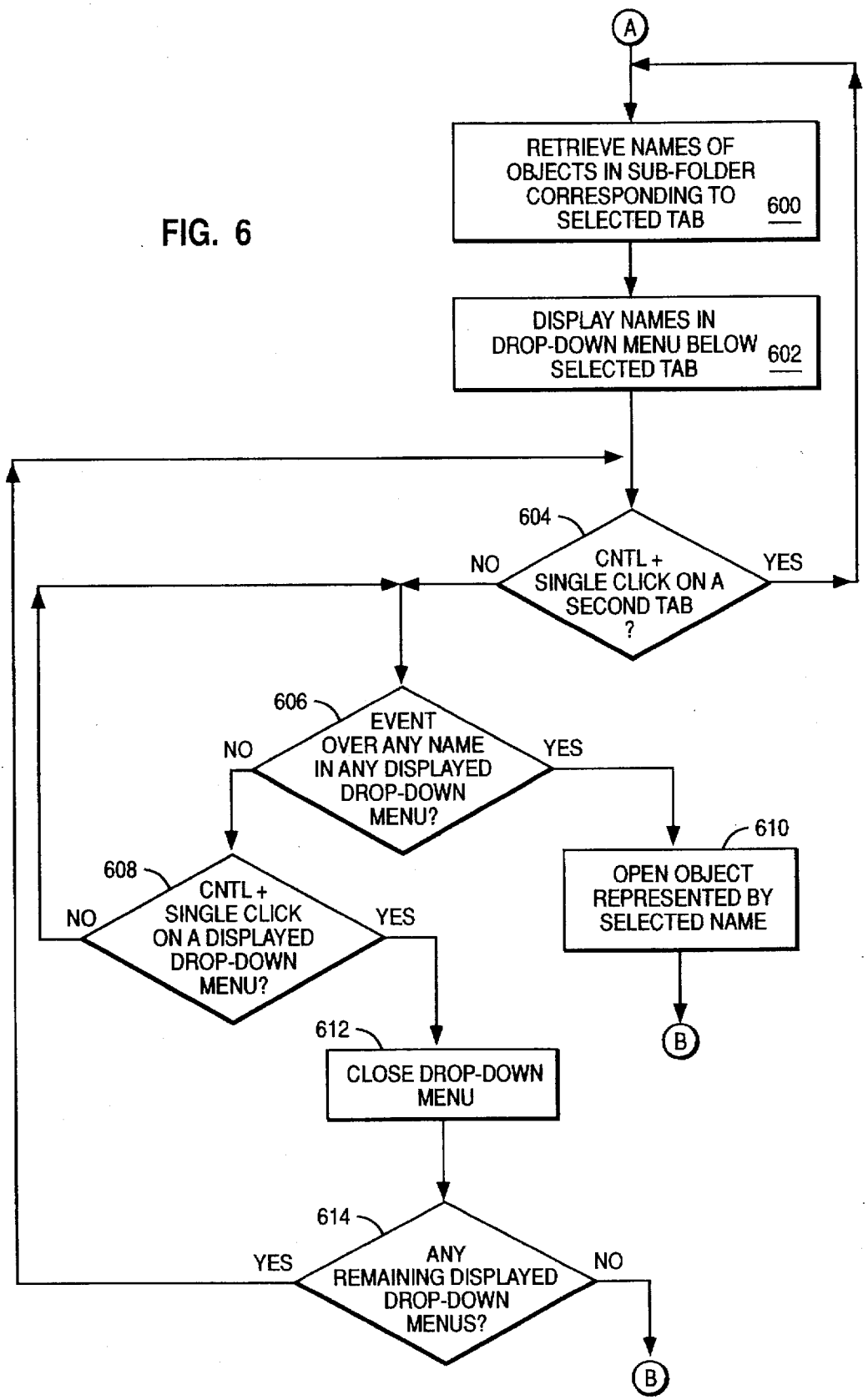

Returning to 550, if the event was not a single click and hold or single click over a tab, at 555, the DT determines if the event was a crtl+single click over a tab. If so, control is directed to "A" of FIG. 6. At 600, the DT retrieves the names of all objects stored within the sub-folder container represented by the selected tab. At 602, the DT displays those names in a drop-down menu directly below the selected tab. At 604, if the DT detects a cntl+single click over a second tab, control returns to 600 and a drop-down menu for the second selected tab is simultaneously displayed with the first drop-down menu, and so on. If not, at 606, the DT determines if the user has selected one of the names in any displayed drop down menu. If so, at 610, the DT opens the object represented by the selected name and control returns to B in FIG. 5. If not, at 608, the DT determines if a cntl+single click occurred over a displayed drop-down menu. If not, control returns to 606. If so, the DT closes the drop-down menu at 612. At 614, the DT determines if any remaining displayed drop-down menus exist. If so, control returns to 604. If not, control returns to B in FIG. 5.

Returning to 570 in FIG. 5, the DT determines if a double click occurred over a tab. If so, a secondary window is displayed at 572 and control returns to 545. If not, at 575, the DT determines if a folder container was dropped onto a tab or drop-down menu of a tab. If so, at 577, the DT adds the contents of the folder container to the sub-folder container represented by the tab/drop-down menu. If not, at 580, the DT determines if a first folder container was dropped between two tabs in folder bar 400. If so, at 582, the DT adds the contents of the first folder container to the folder container displayed in folder bar 400, thereby creating a new sub-folder container. The DT then creates a tab for the new sub-folder container and displays it in folder bar 400. Control returns to 545.

At 585, the DT determines if a first folder container icon was dropped over the folder container icon displayed in folder bar 400. If so, control returns to 540. If not, execution stops.

While the invention has been shown and described with reference to particular embodiments thereof, it will be understood by those skilled in the art that the foregoing and other changes in form and detail may be made therein without departing from the spirit and scope of the invention.

We claim:

1. A computer-implemented method for simultaneously viewing and manipulating a plurality of sub-containers of a container displayed in a folder bar widget on a display screen, comprising the steps of:

displaying a plurality of adjacent tabs within the folder bar widget, each tab representing a sub-container of the container;

displaying a first menu listing first contents of a first sub-container in response to a pointing device activating a first tab representing the first sub-container at a point adjacent to said first tab; and concurrently displaying a second menu listing second contents of a second sub-container in response to the pointing device activating a second tab representing the second sub-container at a point adjacent to said second tab, wherein the first contents and second contents are concurrently displayed in a non-overlapping manner.

2. The method according to claim 1 wherein the step of displaying comprises the step of displaying names of the first contents of the first sub-container for selection by a user.

3. The method according to claim 2 wherein the step of concurrently displaying comprises the step of displaying names of the second contents of the second sub-container for selection by a user.

4. The method according to claim 3 wherein the first and second contents are computer objects, wherein each name represents one computer object.

5. The method according to claim 4 further comprising the step of removing a first portion of the computer objects from the first sub-container in response to the pointing device dragging and dropping the names of the first portion outside the first menu.

6. The method according to claim 4 further comprising the step of opening at least one displayed computer object in response to a pointing device activating the computer object.

7. The method according to claim 1 further comprising the step of adding the contents of a second container to the container in response to the pointing device dragging and dropping an icon representing the second container between the first tab and the second tab in the folder bar widget.

8. The method according to claim 1 further comprising the step of adding the contents of a second container to the first sub-container in response to the pointing device dragging and dropping an icon representing the second container over the first tab.

9. The method according to claim 1 further comprising the step of replacing the container displayed in the folder bar widget with a second container in response to a pointing device dragging and dropping a second icon representing the second container over a first icon representing the container, wherein the first icon is displayed in the folder bar widget.

10. An article of manufacture, comprising:

a computer usable medium having computer readable detailed logic embodied therein for simultaneously viewing and manipulating a plurality of sub-containers of a container displayed in a folder bar widget on a display screen, comprising:

computer readable detailed logic for causing a computer to display a plurality of adjacent tabs within the folder bar widget, each tab representing a sub-container of the container;

computer readable detailed logic for causing the computer to display a first menu listing first contents of a first sub-container in response to a pointing device activating a first tab representing the first sub-container at a point adjacent to said first tab; and computer readable detailed logic for causing the computer to concurrently display a second menu listing second contents of a second sub-container in response to the pointing device activating a second tab representing the second sub-container at a point adjacent to said second tab, wherein the first contents and second contents are concurrently displayed in a non-overlapping manner.

11. The article according to claim 10 further comprising computer readable detailed logic for causing the computer to add the contents of a second container to the container in response to a pointing device dragging and dropping an icon representing the second container between the first tab and the second tab in the folder bar widget.

12. The article according to claim 10 further comprising computer readable detailed logic for causing the computer to remove the first sub-container from the container in response to the pointing device dragging and dropping the first tab outside the folder bar widget.

13. The article according to claim 10 further comprising computer readable detailed logic for causing the computer to add the contents of a second container to the first sub-container in response to the pointing device dragging and dropping an icon representing the second folder container over the first tab.

14. The article according to claim 10 further comprising computer readable detailed logic for causing the computer to replace the container displayed in the folder bar widget with a second container in response to the pointing device dragging and dropping a second icon representing the second container over a first icon representing the container, wherein the first icon is displayed in the folder bar widget.

15. A unique computer system for simultaneously viewing and manipulating a plurality of sub-containers of a container displayed in a folder bar widget on a display screen, comprising:

a processor for causing the system to display a plurality of adjacent tabs within the folder bar widget, each tab representing a sub-container of the container;

the processor for causing the system to display a first menu listing first contents of a first sub-container in response to a pointing device activating a first tab representing the first sub-container at a point adjacent to said first tab; and the processor for causing the system to concurrently display a second menu listing second contents of a second sub-container in response to the pointing device activating a second tab representing the second sub-container at a point adjacent to said second tab, wherein the first contents and second contents are concurrently displayed in a non-overlapping manner.

16. The system according to claim 15 further comprising the processor for causing the system to add the contents of a second container to the container in response to the pointing device dragging and dropping an icon representing the second folder container between the first tab and the second tab in the folder bar widget.

17. The system according to claim 15 further comprising the processor for causing the system to remove the first contents of the first sub-container from the container in response to the pointing device dragging and dropping the first tab outside the folder bar widget.

18. The system according to claim 15 further comprising the processor for causing the system to add the contents of a second container to the first sub-container in response to the pointing device dragging and dropping an icon representing the second folder container over the first tab.

19. The system according to claim 15 further comprising the processor for causing the system to replace the container displayed in the folder bar widget with a second container in response to the pointing device dragging and dropping a second icon representing the second container over a first icon representing the container, wherein the first icon is displayed in the folder bar widget.

* * * * *